(12) United States Patent
Ozaki et al.

(10) Patent No.: US 12,528,553 B2
(45) Date of Patent: Jan. 20, 2026

(54) STRADDLED VEHICLE

(71) Applicant: YAMAHA HATSUDOKI KABUSHIKI KAISHA, Iwata (JP)

(72) Inventors: Yuya Ozaki, Shizuoka (JP); Shidehiko Miyashiro, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 783 days.

(21) Appl. No.: 17/938,927

(22) Filed: Sep. 6, 2022

(65) Prior Publication Data
US 2023/0074254 A1   Mar. 9, 2023

(30) Foreign Application Priority Data

Sep. 7, 2021 (JP) .................. 2021-145480

(51) Int. Cl.
B62J 15/00 (2006.01)
B62J 41/00 (2020.01)
B62K 19/32 (2006.01)
B62K 21/02 (2006.01)

(52) U.S. Cl.
CPC ............... *B62J 41/00* (2020.02); *B62J 15/00* (2013.01); *B62K 19/32* (2013.01); *B62K 21/02* (2013.01)

(58) Field of Classification Search
CPC ...................................................... B62J 15/00
USPC ....................................................... 180/229
See application file for complete search history.

(56) References Cited

U.S. PATENT DOCUMENTS

| 4,770,460 A | * | 9/1988 | Miura | B62J 17/10 296/180.1 |
| 4,822,067 A | * | 4/1989 | Matsuo | B62J 15/00 296/180.1 |
| 4,982,973 A | * | 1/1991 | Saito | B60K 11/08 296/180.1 |
| 6,651,769 B2 | * | 11/2003 | Laivins | B62J 15/00 180/68.1 |
| 7,325,639 B2 | * | 2/2008 | Yamaguchi | B62J 15/00 280/852 |
| 7,387,180 B2 | * | 6/2008 | Konno | B62J 17/10 180/219 |

(Continued)

FOREIGN PATENT DOCUMENTS

JP   S6235673 Y2   9/1987
JP   4140196 B2 * 8/2008

*Primary Examiner* — Valentin Neacsu
*Assistant Examiner* — Hosam Shabara
(74) *Attorney, Agent, or Firm* — Rabin & Berdo, P.C.

(57) ABSTRACT

A straddled vehicle including: a vehicle body frame having a head pipe and a down frame extending downward and rearward from the head pipe; a steering shaft rotatably inserted in the head pipe; a front fork linked to the steering shaft, the front fork including an outer tube and an inner tube that is slidably inserted in the outer tube; a bottom bridge linking the front fork and a portion of the steering shaft that is downward relative to the head pipe; a radiator arranged rearward of the front fork, the radiator overlapping the outer tube in a front view; a front wheel supported by the front fork; a front fender arranged upward of the front wheel; and a rectifier member attached to a portion of the outer tube that is upward of the front wheel and downward of the bottom bridge, the rectifier member extending rearward.

12 Claims, 8 Drawing Sheets

(56) References Cited

U.S. PATENT DOCUMENTS

| | | | | |
|---|---|---|---|---|
| 7,665,797 B1* | 2/2010 | Brosseau | ............. | F01N 13/082 |
| | | | | 296/180.1 |
| 7,857,084 B2* | 12/2010 | Okamoto | ................ | B62J 15/00 |
| | | | | 280/288.4 |
| 9,592,872 B2* | 3/2017 | Takasaki | ................ | B62K 11/04 |
| 9,663,175 B2* | 5/2017 | Kitayama | ................ | B62J 15/00 |
| 11,077,907 B2* | 8/2021 | Yamamoto | ....... | B60K 15/03504 |
| 2016/0144921 A1* | 5/2016 | Oshima | ................... | B62J 15/00 |
| | | | | 180/219 |

* cited by examiner

STRADDLED VEHICLE

CROSS-REFERENCE TO RELATED APPLICATIONS

This application claims the benefit of priority to Japanese Patent Application No. 2021-145480 filed on Sep. 7, 2021, the entire contents of which are hereby incorporated herein by reference.

BACKGROUND OF THE INVENTION

Field of the Invention

The present invention relates to a straddled vehicle.

Description of the Related Art

Straddled vehicles have been known in the art, in which the gap between the front wheel and the bottom bridge is relatively large, such as motocrossers. With straddled vehicles of this type, the air flowing rearward above the front wheel and below the bottom bridge is blown onto the engine and other parts. The engine and other parts are cooled by the air.

If the rearward flow of the air flowing above the front wheel and below the bottom bridge is disturbed, objects to be cooled such as the engine will no longer be cooled desirably. Therefore, it has been proposed to arrange a rectifier member above the front wheel and below the bottom bridge.

Japanese Examined Utility Model Application Publication S62-35673 describes arranging an airguide having an H-shaped cross section in the space that is downward of the front fender supported on the bottom bridge and upward of the front wheel and that is between the left tube and the right tube of the front fork. Japanese Examined Utility Model Application Publication S62-35673 states that the air flowing rearward is guided by the airguide to the engine, thereby efficiently cooling the engine. The invention disclosed in Japanese Examined Utility Model Application Publication S62-35673 aims at efficiently guiding the air, having flown rearward through this space, to the engine located rearward of this space. The airguide having an H-shaped cross section provided between the left tube and the right tube and is used exclusively to enhance the directionality of the airflow having passed through the space.

Now, there are known straddled vehicles in which a radiator is arranged directly behind the left tube or the right tube of the front fork. With such straddled vehicles, in order to improve the cooling performance of the radiator, it is preferred that the air rearward of the left tube or the right tube of the front fork is guided desirably to the radiator after the flow is rectified. With the airguide described above, however, it is not possible to desirably guide the air to the radiator that is arranged directly behind the left tube or the right tube of the front fork.

SUMMARY OF THE INVENTION

An object of the present invention is to provide a straddled vehicle including a radiator arranged directly behind a tube of a front fork, wherein the cooling performance of the radiator is improved by desirably guiding the air from the front side to the radiator.

A straddled vehicle disclosed herein includes: vehicle body frame including a head pipe and a down frame extending downward and rearward from the head pipe; a steering shaft rotatably inserted into the head pipe; a front fork linked to the steering shaft; a bottom bridge linking together a portion of the steering shaft that is downward relative to the head pipe and the front fork; a radiator arranged rearward of the front fork; a front wheel supported on the front fork; and a front fender arranged upward of the front wheel. The front fork includes an outer tube, and an inner tube that is slidably inserted into the outer tube. The radiator overlaps with the outer tube as the vehicle is viewed from the front. The straddled vehicle includes a rectifier member attached to a portion of the outer tube that is upward of the front wheel and downward of the bottom bridge and extending rearward in a vehicle front-rear direction.

In the straddled vehicle, the radiator is arranged directly behind the outer tube of the front fork. There is a concern that the rearward airflow upward of the front wheel and the downward of the bottom bridge is disturbed by the outer tube, thereby decreasing the cooling performance of the radiator. However, the rectifier member is provided on a portion of the outer tube that is upward of the front wheel and downward of the bottom bridge. Therefore, with the rectifier member, it is possible to rectify the airflow, thereby desirably guiding the air to the radiator. Therefore, it is possible to improve the cooling performance of the radiator. Note that when the straddled vehicle runs over a step, for example, the front fork contracts, and the inner tube slides against the outer tube. However, since the rectifier member is attached to the outer tube, the rectifier member will not interfere with the elongation/contraction of the front fork.

A shape of a horizontal cross section of the rectifier member may be formed in a streamlined shape.

This reduces the disturbance of the airflow guided to the radiator, and it is therefore possible to improve the cooling performance of the radiator.

The rectifier member may include a portion whose dimension in a vehicle width direction gradually decreases rearward in the vehicle front-rear direction.

This reduces the disturbance of the airflow guided to the radiator, and it is therefore possible to improve the cooling performance of the radiator.

A shape of a horizontal cross section of the rectifier member may be formed in such a shape that a geometric center of a figure delimited by an outer contour of the rectifier member is located outward in the vehicle width direction relative to a center of the outer tube.

With the presence of the front fender, the airflow rearward of the outer tube tends not to flow in the space inward relative to the outer tube in the vehicle width direction. However, according to this, the shape of the horizontal cross section of the rectifier member is formed in a shape that is lopsided outward in the vehicle width direction. This allows the airflow rearward of the outer tube to be desirably guided into the space inward relative to the outer tube in the vehicle width direction while reducing the disturbance of the airflow. Therefore, the airflow can be guided relatively evenly to the radiator. Therefore, it is possible to improve the cooling performance of the radiator.

A dimension of the rectifier member in the vehicle front-rear direction may be one half or more of a distance in the vehicle front-rear direction between a front end of the outer tube and a front end of the radiator.

Therefore, since the dimension of the rectifier member in the front-rear direction is relatively large, it is possible to increase the rectifying effect. It is possible to improve the cooling performance of the radiator.

The rectifier member may be formed in a triangular shape as the vehicle is viewed from the side.

When the steering shaft rotates leftward or rightward, the front fork also rotates leftward or rightward, and the rectifier member rotates leftward or rightward. However, according to this, it is possible to prevent interference between the rectifier member and the down frame while ensuring the dimension of the rectifier member.

A dimension of the rectifier member in a vehicle up-down direction may be one half or more of a dimension of the radiator in the vehicle up-down direction.

Since the dimension of the rectifier member in the up-down direction is relatively large, it is possible to increase the rectifying effect. Therefore, it is possible to improve the cooling performance of the radiator.

The outer tube may be arranged upward of the inner tube.

The straddled vehicle may include a side cover having a forward portion that is arranged outward of the radiator in a vehicle width direction and forward of the radiator in the vehicle front-rear direction. The forward portion of the side cover may be arranged outward of the rectifier member in the vehicle width direction and extending outward in the vehicle width direction and forward in the vehicle front-rear direction. The rectifier member may include a portion that overlaps with the forward portion of the side cover as the vehicle is viewed from the side.

Therefore, the rectifier member and the side cover allow the airflow to be desirably guided to the radiator.

The radiator may be arranged outward of the down frame in a vehicle width direction.

The rectifier member may be attached to a rearward portion of the outer tube in the vehicle front-rear direction. A forward portion of the outer tube in the vehicle front-rear direction may be exposed.

Therefore, it is possible to reduce the size of the rectifier member as compared with a case where the rectifier member is formed in a shape that surrounds the entire circumference of the outer tube.

The front fender may be supported on the bottom bridge.

The straddled vehicle may include a lower bracket fixed to a lower end portion of the front fork. The front fender may be supported on the lower bracket.

According to the present invention, it is possible to provide a straddled vehicle including a radiator arranged directly behind a tube of a front fork, wherein the cooling performance of the radiator is improved by desirably guiding the air from the front side to the radiator.

DETAILED DESCRIPTION OF THE PREFERRED EMBODIMENTS

First Embodiment

Figure 1:
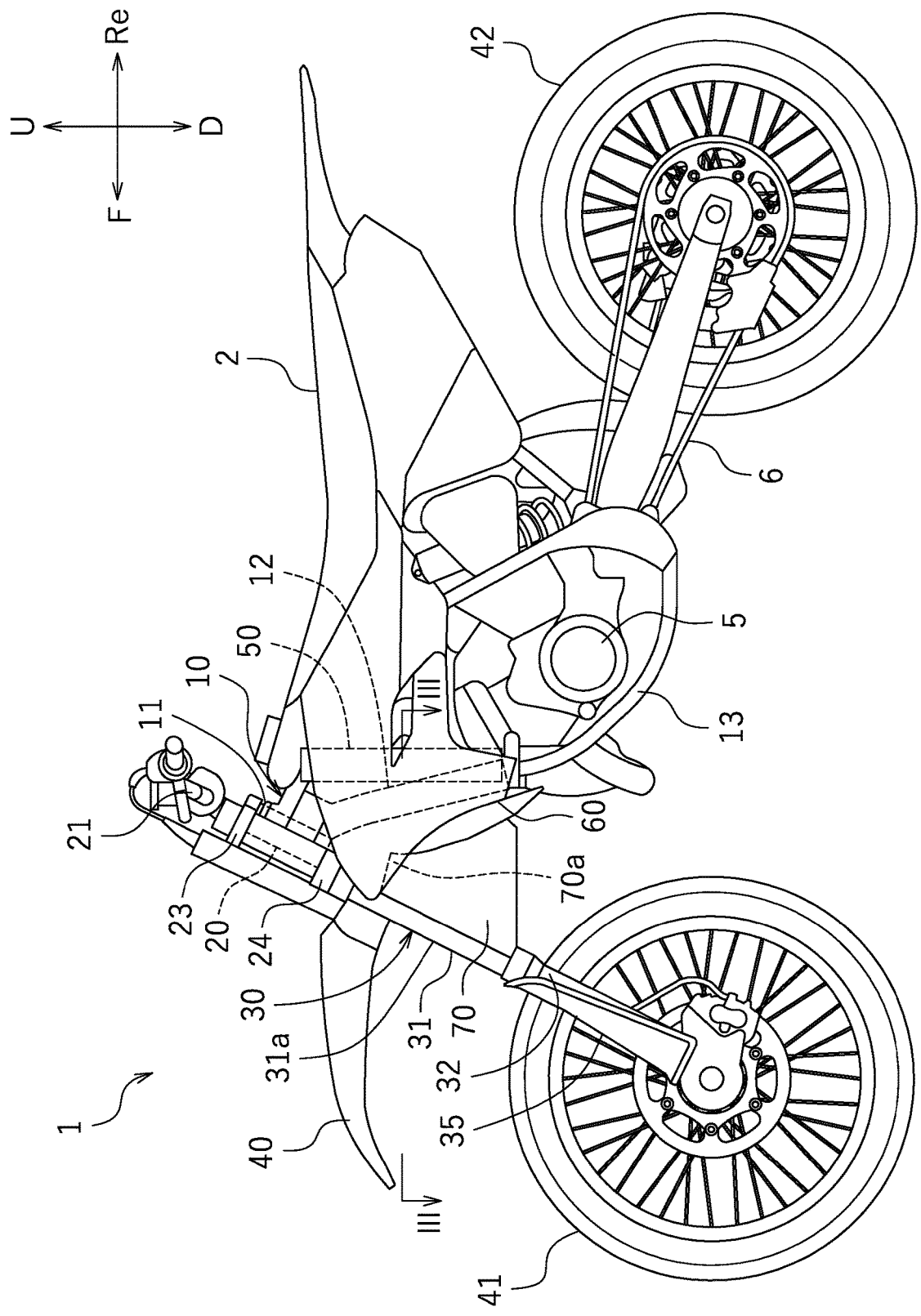
FIG. 1 is a left side view showing a motorcycle according to a first embodiment.

An embodiment will now be described with reference to the drawings. A motorcycle 1 will be described below as an example straddled vehicle. The motorcycle 1 to be described below is a motorcycle in which the gap between a front wheel 41 and a bottom bridge 24 is relatively large. FIG. 1 is a left side view of the motorcycle 1 according to the first embodiment. The motorcycle 1 according to the first embodiment is a so-called off-road vehicle, a motocrosser. The motorcycle 1 according to the first embodiment is a motorcycle in which the gap between the front wheel 41 and a front fender 40 is relatively large. The front fender 40 is supported on the bottom bridge 24, as will be described below in detail. The front fender 40 is a so-called up fender.

The terms front, rear, left, right, up and down, as used in the description below, refer to these directions as viewed from a virtual rider seated on a seat 2 while the motorcycle 1 is standing upright on a horizontal surface with no rider and no load thereon, unless specified otherwise. The designations F, Re, L, R, U and D, as used in the figures, refer to front, rear, left, right, up and down, respectively. A horizontal cross section refers to a cross section that is parallel to a horizontal surface when the motorcycle 1 is standing upright on the horizontal surface with no rider and no load thereon.

The term "forward" refers not only to the direction that extends horizontally in the front direction along the vehicle center line CL (see FIG. 3), but also to directions that are inclined from that direction by an angle that is less than 90 degrees. The term "rearward" refers not only to the direction that extends horizontally rearward along the vehicle center line CL, but also to directions that are inclined from that direction by an angle that is less than 90 degrees. The term "leftward" refers not only to the direction that extends horizontally leftward along a line that is vertical to the vehicle center line CL, but also to directions that are inclined from that direction by an angle that is less than 90 degrees. The term "rightward" refers not only to the direction that extends horizontally rightward along a line that is vertical to the vehicle center line CL, but also to directions that are inclined from that direction by an angle that is less than 90 degrees. The term "upward" refers not only to the direction that extends upward along the vertical line, but also to directions that are inclined from that direction by an angle that is less than 90 degrees. The term "downward" refers not only to the direction that extends downward along the vertical line, but also to directions that are inclined from that direction by an angle that is less than 90 degrees.

The vehicle width direction coincides with the left-right direction. Inward in the vehicle width direction refers to the direction toward the vehicle center line CL. Outward in the vehicle width direction refers to the direction away from the vehicle center line CL. In the area leftward relative to the vehicle center line CL, inward in the vehicle width direction corresponds to rightward, and outward in the vehicle width direction corresponds to leftward. In the area rightward relative to the vehicle center line CL, inward in the vehicle width direction corresponds to leftward, and outward in the vehicle width direction corresponds to rightward.

As shown in FIG. 1, the motorcycle 1 includes a vehicle body frame 10, a drive source 5 supported on the vehicle body frame 10, a seat 2 supported on the vehicle body frame 10, a steering shaft 20, a front fork 30, the front wheel 41, a rear wheel 42, the front fender 40, a radiator 50, left and right side covers 60, and a rectifier member 70. Note that the side cover 60 as used herein is a member that corresponds to a so-called shroud, but there is no particular limitation thereto.

The drive source 5 is a device that generates power for driving the motorcycle 1. There is no particular limitation on the type of the drive source 5. The drive source 5 may be, for example, an internal combustion engine or may be an electric motor. The drive source 5 is linked to the rear wheel 42 via a power transmission member such as a chain 6. The rear wheel 42 is the drive wheel that is driven by the drive source 5. The front wheel 41 is a non-driven wheel that is not driven.

The vehicle body frame 10 includes a head pipe 11, a down frame 12 extending downward and rearward from the head pipe 11, and left and right lower frames 13 extending downward and rearward from the lower end portion of the down frame 12.

The steering shaft 20 is rotatably inserted into the head pipe 11. A top bridge 23 is fixed to an upper portion of the steering shaft 20 and the bottom bridge 24 is fixed to a lower portion of the steering shaft 20. A handlebar 21 is fixed to the top bridge 23.

Figure 2:
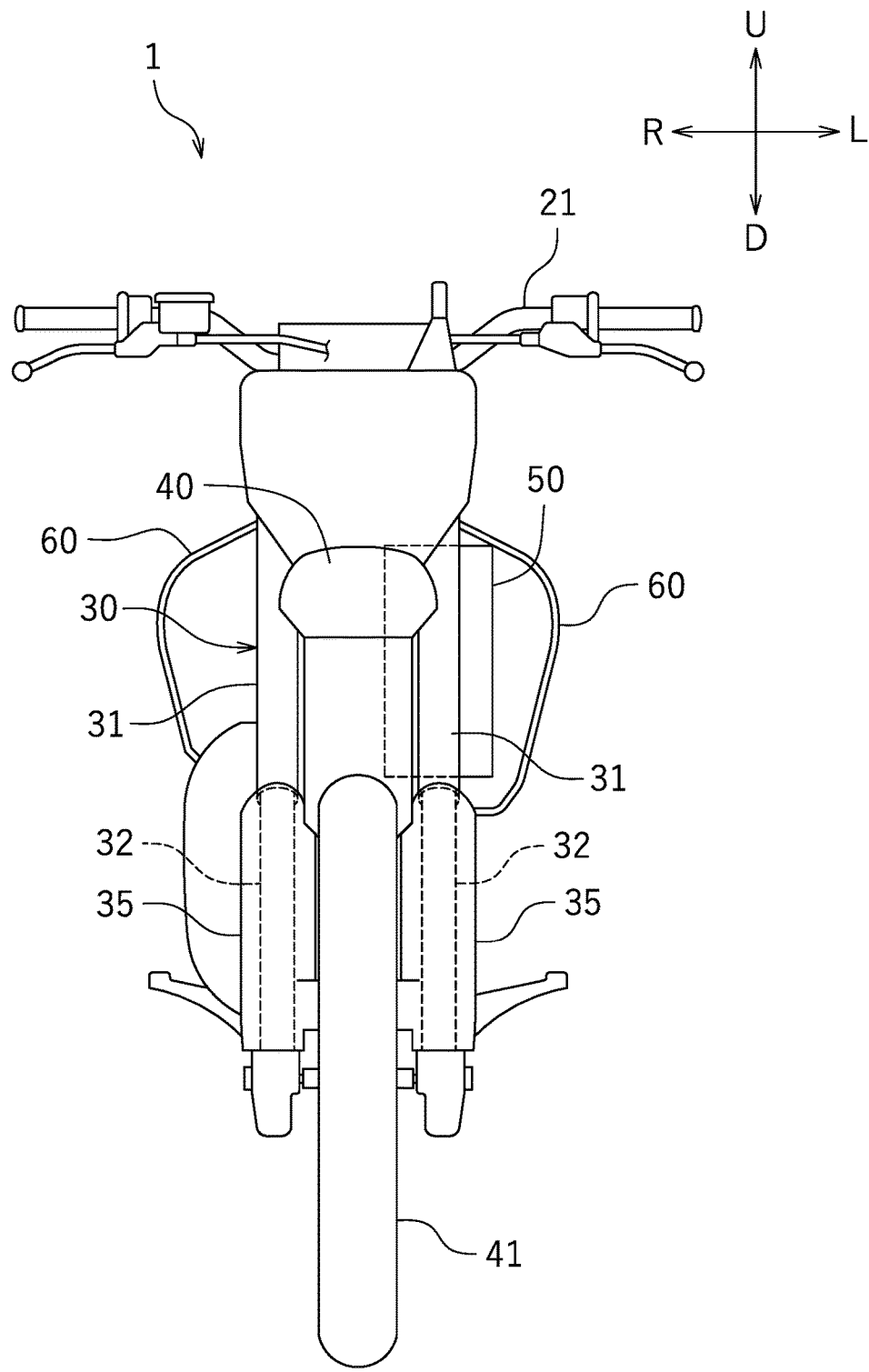
FIG. 2 is a front view showing the motorcycle.

The front fork 30 is fixed to the top bridge 23 and the bottom bridge 24. The front fork 30 is linked to the steering shaft 20 via the top bridge 23 and the bottom bridge 24. The top bridge 23 links together a portion of the steering shaft 20 that is upward relative to the head pipe 11 and the front fork 30. The bottom bridge 24 links together a portion of the steering shaft 20 that is downward relative to the head pipe 11 and the front fork 30. FIG. 2 is a front view showing the motorcycle 1. The front fork 30 includes left and right outer tubes 31 and left and right inner tubes 32 that are slidably inserted into the left and right outer tubes 31, respectively. The front fork 30 according to the present embodiment is a so-called inverted front fork. The outer tube 31 is arranged upward of the inner tube 32. The front wheel 41 is supported on a lower end portion of the front fork 30. A cover 35 is arranged forward and sideward of the inner tube 32.

The front fender 40 is supported on the bottom bridge 24. Note however there is no limitation thereto. The front fender 40 may be supported on a portion other than the bottom bridge 24. The front fender 40 may be supported on the front fork 30 or may be supported on the vehicle body frame 10, for example. The front fender 40 may be supported on the outer tube 31 of the inverted front fork 30.

Figure 3:
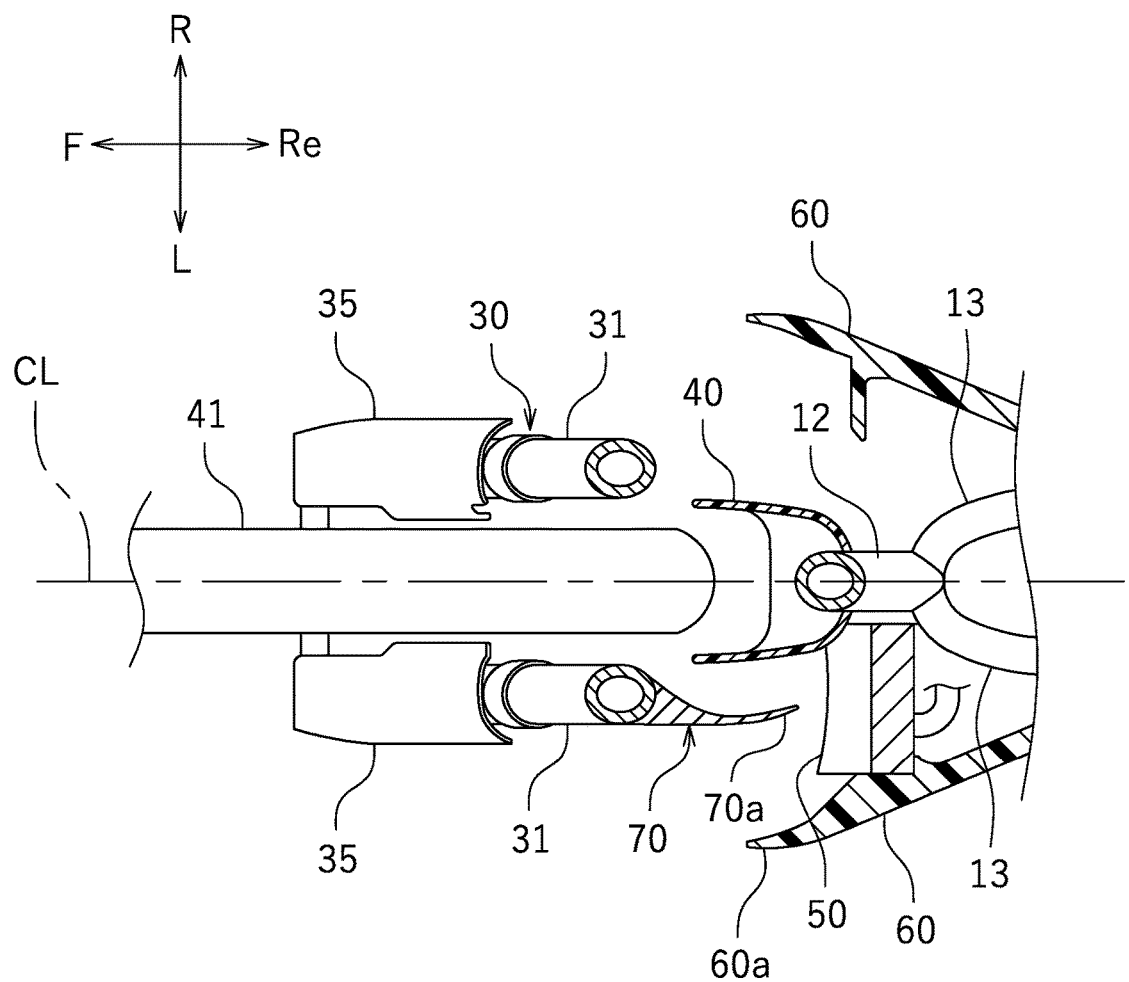
FIG. 3 is a cross-sectional view taken along line of FIG. 1.

FIG. 3 is a cross-sectional view taken along line III-III of FIG. 1. As shown in FIG. 3, the down frame 12 is arranged on the vehicle center line CL. The radiator 50 is arranged sideward of the down frame 12. Here, the radiator 50 is arranged leftward of the down frame 12. The radiator 50 may be arranged leftward of the left end of the down frame 12. The radiator 50 is arranged leftward of the vehicle center line CL. The radiator 50 overlaps with the down frame 12 as the vehicle is viewed from the side. At least a portion of the radiator 50 is arranged directly behind the left outer tube 31 of the front fork 30. As shown in FIG. 2, the radiator 50 overlaps with the left outer tube 31 as the vehicle is viewed from the front. Note that although not shown in the figures, a plurality of louvers may be arranged forward of the radiator 50. Note however that louvers may not be necessary and may be optional.

As shown in FIG. 3, the left side cover 60 includes a forward portion 60a arranged leftward and forward of the radiator 50. The forward portion 60a is arranged outward in the vehicle width direction and forward of the radiator 50. The forward portion 60a is arranged leftward of the rectifier member 70. The forward member 60a extends leftward and forward. In other words, the forward portion 60a is arranged outward of the rectifier member 70 in the vehicle width direction, and extends forward and outward in the vehicle width direction.

As shown in FIG. 1, the rectifier member 70 is attached to the left outer tube 31. The outer tube 31 includes a portion 31a that is located upward of the front wheel 41 and downward of the front fender 40. The rectifier member 70 is attached to the portion 31a of the left outer tube 31. The rectifier member 70 extends upward in the vehicle up-down direction and rearward in the vehicle front-rear direction.

Figure 5:
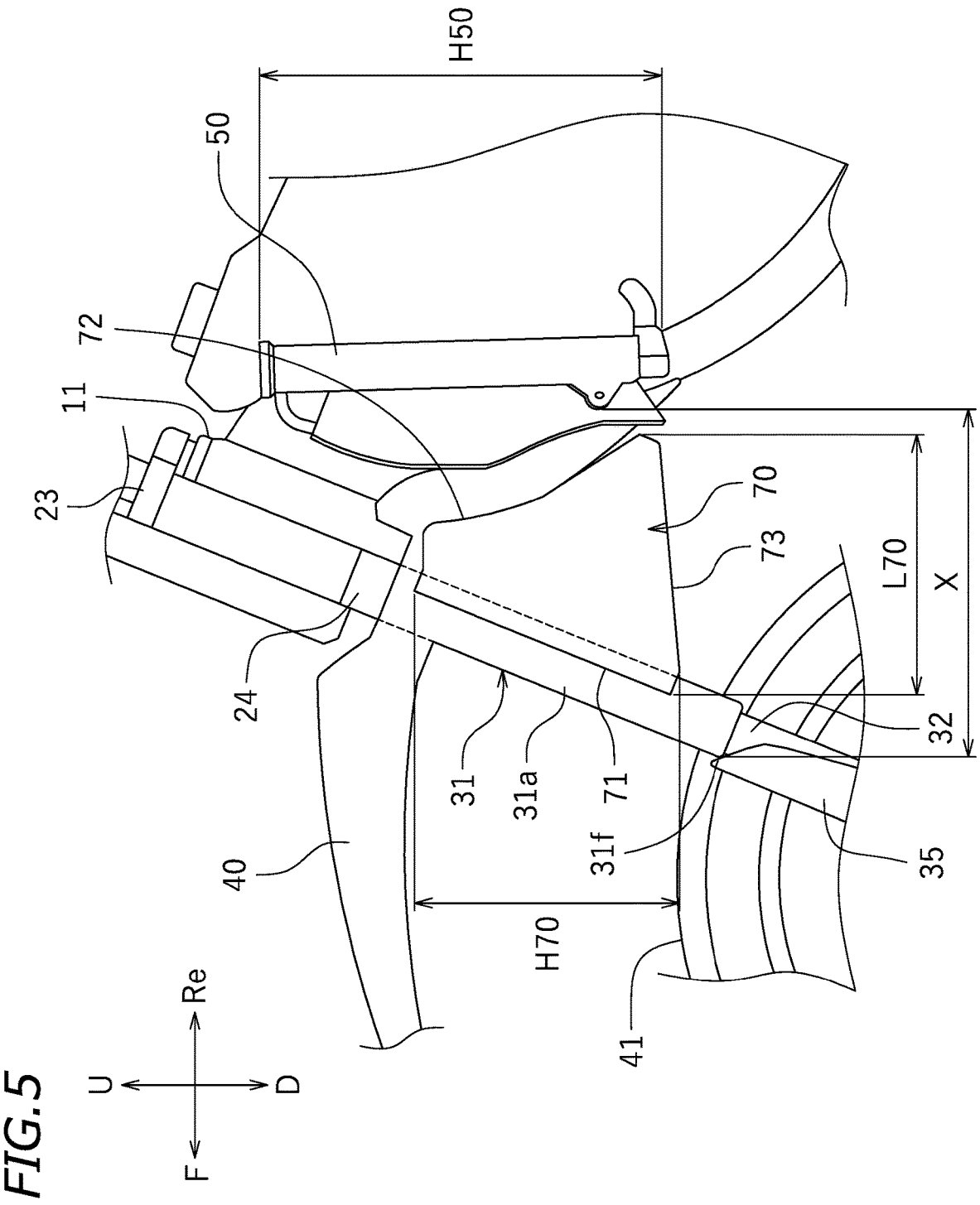
FIG. 5 is a partial left side view showing the motorcycle.

The rectifier member 70 is formed in a triangular shape as the vehicle is viewed from the side. Note that a triangle as used herein is not limited to a triangle in the strict sense, but includes shapes that are substantially triangular. As shown in FIG. 5, as the vehicle is viewed from the side, the rectifier member 70 includes a front edge 71 extending upward and rearward, a rear edge 72 extending rearward and downward from the upper end of the front edge 71, and a lower edge 73 extending rearward from the lower end of the front edge 71. The front edge 71, the rear edge 72 and the lower edge 73 may be straight, curved, or partially bent.

Figure 4:
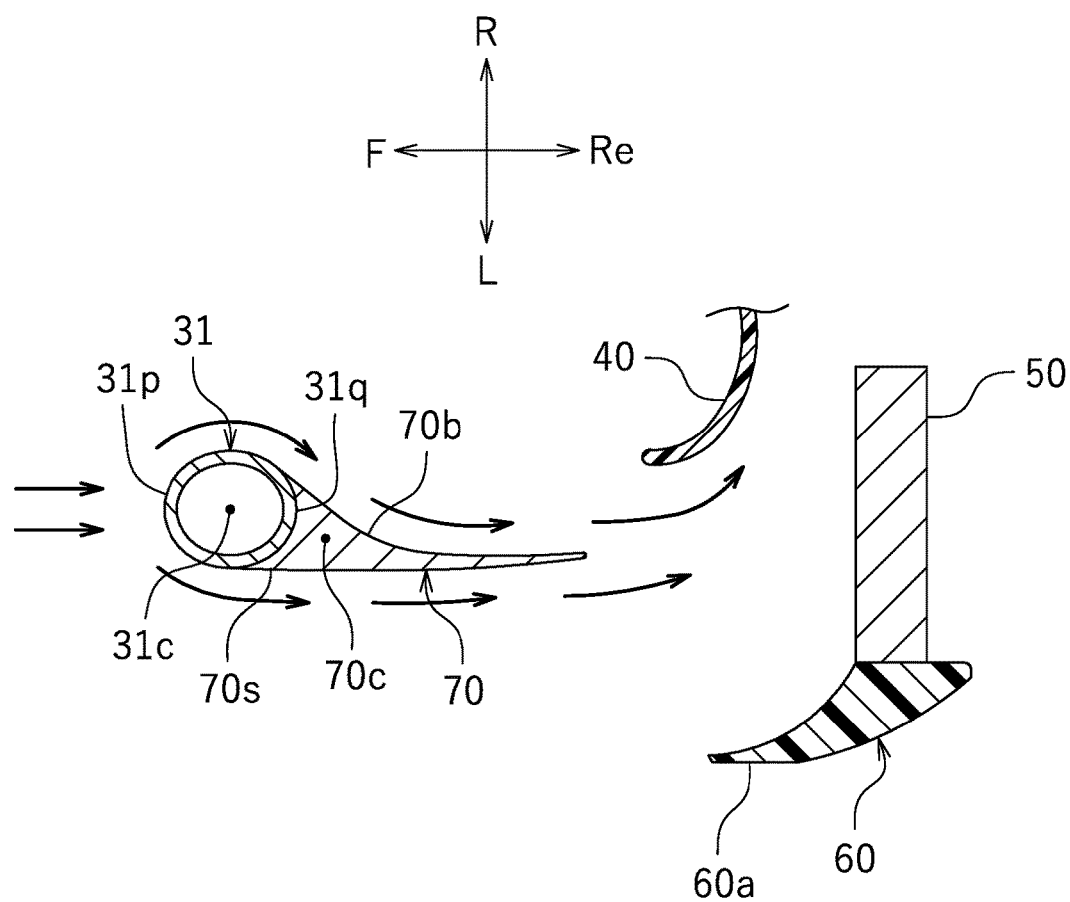
FIG. 4 is a horizontal cross-sectional view showing an outer tube of a front fork, a rectifier member, a front fender and a radiator.

FIG. 4 is a horizontal cross-sectional view showing the rectifier member 70. The shape of the horizontal cross section of the rectifier member 70 (hereinafter referred to simply as the cross-sectional shape) is formed in a streamlined shape. The rectifier member 70 includes a portion 70b whose dimension in the vehicle width direction gradually decreases rearward. In the present embodiment, the rectifier member 70 is attached to a rearward portion 31q of the outer tube 31. A forward portion 31p of the outer tube 31 is exposed. The forward portion 31p of the outer tube 31 is directly exposed to the airflow from the front.

The cross-sectional shape of the rectifier member 70 may be a left-right symmetric shape or may be a left-right asymmetric shape. Here, the cross-sectional shape of the rectifier member 70 is formed in a shape that is lopsided leftward. That is, the cross-sectional shape of the rectifier member 70 is formed in a shape that is lopsided outward in the vehicle width direction. Specifically, the cross-sectional shape of the rectifier member 70 is formed in a shape such that the geometric center (geometric center) 70c of the figure delimited by the outer contour 70s of the rectifier member 70 is located outward in the vehicle width direction relative to the center 31c of the outer tube 31. Note that the geometric center is the arithmetic mean position taken over all the points belonging to the figure, and if the figure has uniform density, the geometric center is the position that coincides with the center of gravity.

FIG. 5 is a partial side view showing the motorcycle 1 with the side cover 60 removed. While there is no particular limitation on the dimension L70 of the rectifier member 70 in the front-rear direction, it is herein one half or more of the distance X in the front-rear direction between the front end 31f of the outer tube 31 and the front end 50f of the radiator 50. That is, $L70 \geq 0.5 \cdot X$.

While there is no particular limitation on the dimension H70 in the up-down direction of the rectifier member 70, it is herein one half or more of the dimension H50 in the up-down direction of the radiator 50. That is, $H70 \geq 0.5 \cdot H50$. Note that the dimension L70 in the front-rear direction of the rectifier member 70 may be one half or more of the dimension H50 in the up-down direction of the radiator 50.

As shown in FIG. 1, the rectifier member 70 includes a portion (hereinafter referred to as the overlap portion) 70a that overlaps with the side cover 60 as the vehicle is viewed from the side. The overlap portion 70a of the rectifier member 70 overlaps with the forward portion 60a of the side cover 60 as the vehicle is viewed from the side (see FIG. 3).

The rectifier member 70 includes a portion that overlaps with the front fender 40 as the vehicle is viewed from the side. For example, a part or whole of the overlap portion 70a may overlap with the front fender 40 as the vehicle is viewed from the side.

The motorcycle 1 is configured as described above.

Figure 6:
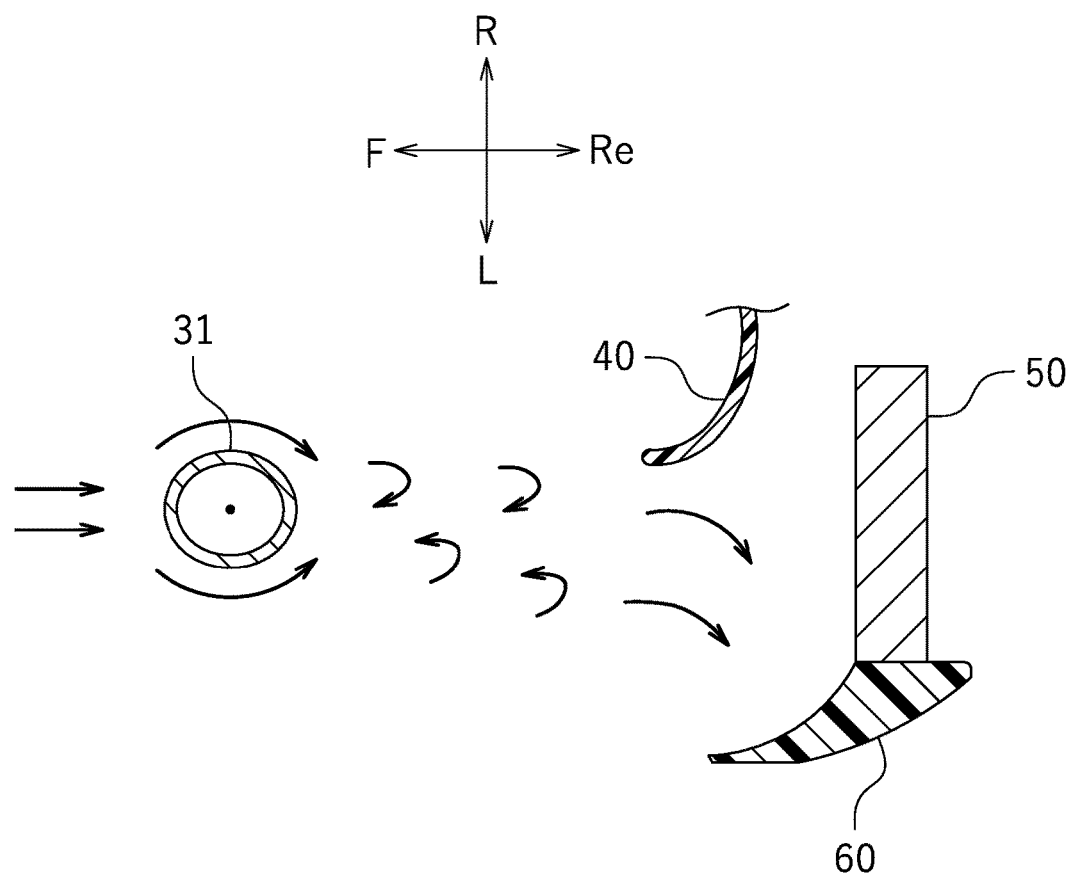
FIG. 6 is a horizontal cross-sectional view showing an outer tube of a front fork, a front fender and a radiator.

As the motorcycle 1 travels, the air flows through the motorcycle 1 from the front to the rear. FIG. 6 is a horizontal cross-sectional view showing the airflow in the absence of the rectifier member 70. The radiator 50 is arranged directly behind the left outer tube 31 of the front fork 30. In the absence of the rectifier member 70, the airflow tends to be disturbed rearward of the outer tube 31. If the airflow is disturbed, there is concern that the radiator 50 may not be desirably cooled by the air. That is, there is concern that the cooling performance of the radiator 50 will decrease.

The front fender 40 is present rearward and rightward of the left outer tube 31. Rearward of the left outer tube 31, the air tends to flow leftward. Therefore, there is concern that a sufficient amount of air may not flow to the rightward portion of the radiator 50. That is, there is concern that a sufficient amount of air may not flow to the inward portion of the radiator 50 in the vehicle width direction. This is also a concern that the cooling performance of the radiator 50 may decrease.

However, according to the present embodiment, the rectifier member 70 is attached to the outer tube 31 as shown in FIG. 4. The rectifier member 70 reduces the disturbance of the airflow rearward of the outer tube 31. Air with rectified flow is supplied to the radiator 50. Therefore, it is possible to increase the cooling performance of the radiator 50.

According to the present embodiment, the horizontal cross section of the rectifier member 70 is formed in a shape that is lopsided leftward. Therefore, a sufficient amount of air can be sent rearward and rightward of the left outer tube 31. A sufficient amount of air can be sent rearward of the outer tube 31 and inward in the vehicle width direction. Therefore, despite the presence of the front fender 40 inward of the outer tube 31 in the vehicle width direction, a sufficient amount of air can be sent to the inward portion of the radiator 50 in the vehicle width direction. This can also improve the cooling performance of the radiator 50.

As described above, with the motorcycle 1 according to the present embodiment, the rectifier member 70 is provided in the portion 31a of the outer tube 31 upward of the front wheel 41 and downward of the bottom bridge 24. Therefore, the air can be desirably guided to the radiator 50. Therefore, it is possible to improve the cooling performance of the radiator 50. Note that when the motorcycle 1 runs over a step, for example, the inner tube 32 slides against the outer tube 31, thereby elongating/contracting the front fork 30. However, since the rectifier member 70 is attached to the outer tube 31, the rectifier member 70 will not interfere with the elongation/contraction of the front fork 30.

According to the present embodiment, the shape of the horizontal cross section of the rectifier member 70 is formed in a streamlined shape (see FIG. 4). The rectifier member 70 has the portion 70b whose dimension in the vehicle width direction gradually decreases rearward. This reduces the disturbance of the airflow guided to the radiator 50, and it is therefore possible to improve the cooling performance of the radiator 50.

As described above, with the presence of the front fender 40, the airflow rearward of the outer tube 31 tends not to flow in the space inward relative to the outer tube 31 in the vehicle width direction. However, according to the present embodiment, the shape of the horizontal cross section of the rectifier member 70 is formed in a shape that is lopsided outward in the vehicle width direction. This allows the airflow rearward of the outer tube 31 to be desirably guided into the space inward relative to the outer tube 31 in the vehicle width direction while reducing the disturbance of the airflow. Therefore, the airflow can be guided relatively evenly to the radiator 50. Therefore, it is possible to improve the cooling performance of the radiator 50.

According to the present embodiment, the dimension L70 of the rectifier member 70 in the vehicle front-rear direction is one half of more of the distance X in the vehicle front-rear direction between the front end 31f of the outer tube 31 and the front end 50f of the radiator 50. Since the dimension L70 of the rectifier member 70 in the vehicle front-rear direction is relatively large, it is possible to increase the rectifying effect. Therefore, it is possible to improve the cooling performance of the radiator 50.

The rectifier member 70 is linked to the steering shaft 20 via the front fork 30. When the steering shaft 20 rotates leftward or rightward, the rectifier member 70 rotates leftward or rightward. However, according to the present embodiment, the rectifier member 70 is formed in a triangular shape as the vehicle is viewed from the side. Therefore, it is possible to prevent interference between the rectifier member 70 and the down frame 12 while ensuring the dimension of the rectifier member 70.

According to the present embodiment, the dimension H70 of the rectifier member 70 in the vehicle up-down direction is one half or more of the dimension H50 of the radiator 50 in the vehicle up-down direction. Since the dimension H70 of the rectifier member 70 in the vehicle up-down direction is relatively large, it is possible to increase the rectifying effect. Therefore, it is possible to improve the cooling performance of the radiator 50.

According to the present embodiment, the forward portion 60a of the side cover 60 is arranged outward of the rectifier member 70 in the vehicle width direction, and extends outward in the vehicle width direction and forward in the vehicle front-rear direction. The rectifier member 70 includes the overlap portion 70a that overlaps with the forward portion 60a of the side cover 60 as the vehicle is viewed from the side. An air passageway is formed between the rectifier member 70 and the side cover 60, which leads the air to the radiator 50. Therefore, the rectifier member 70 and the forward portion 60a of the side cover 60 allow the air to be desirably guided to the radiator 50 (see FIG. 3).

According to the present embodiment, the rectifier member 70 includes a portion that overlaps with a front fork 40 as the vehicle is viewed from the side. An air passageway is formed between the rectifier member 70 and the front fork 40, which leads the air to the radiator 50. The rectifier member 70 and the front fork 40 allow the air to be desirably guided to the radiator 50.

According to the present embodiment, the rectifier member 70 is attached to the rearward portion 31q of the outer tube 31 in the vehicle front-rear direction. The forward portion 31p of the outer tube 31 in the vehicle front-rear direction is exposed. Therefore, it is possible to reduce the size of the rectifier member 70 as compared with a case where the rectifier member 70 is formed in a shape that surrounds the entire circumference of the outer tube 31.

Second Embodiment

Figure 7:
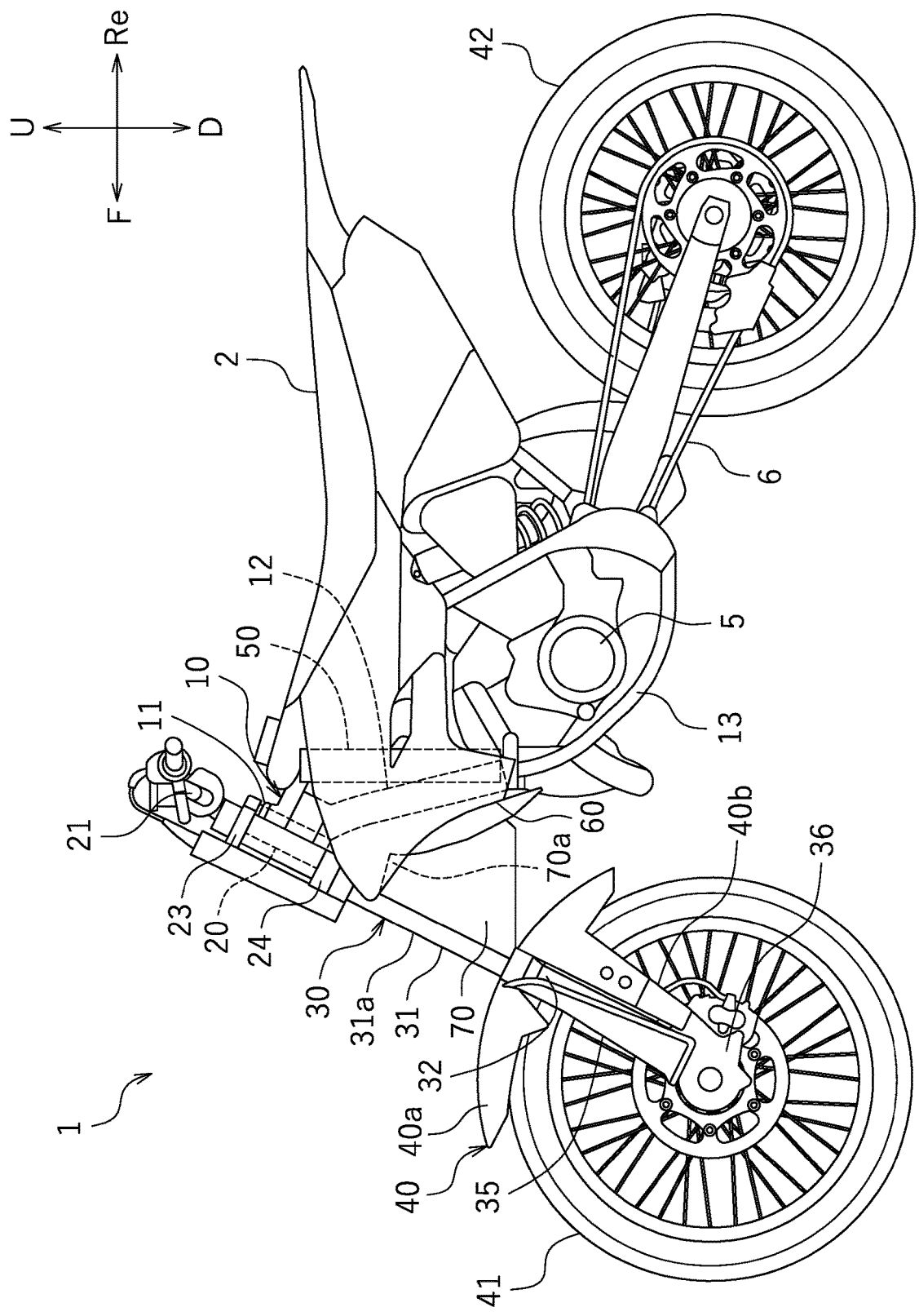
FIG. 7 is a left side view showing a motorcycle according to a second embodiment.

FIG. 7 is a left side view showing the motorcycle 1 according to the second embodiment. In the second embodiment, the front fender 40 is a so-called down fender. In the following description, like elements to those of the first embodiment will be denoted by like reference signs and will not be described below.

Also in the second embodiment, the motorcycle 1 includes the inverted front fork 30, and the outer tube 31 is arranged upward of the inner tube 32. The rectifier member 70 is provided on the outer tube 31. The rectifier member 70 is attached to the portion 31*a* of the outer tube 31 that is upward of the front wheel 41 and downward of the bottom bridge 24.

In the first embodiment, the rectifier member 70 is arranged downward of the front fender 40. The rectifier member 70 is supported on the bottom bridge 24. In contrast, in the second embodiment, the rectifier member 70 is arranged upward of the front fender 40. A lower bracket 36 is fixed to the lower end portion of the inner tube 32. In the second embodiment, the front fender 40 is supported on the lower bracket 36.

Specifically, the front fender 40 includes a fender body 40*a* extending in the front-rear direction, and a support plate 40*b* extending downward from the fender body 40*a*. The lower end portion of the support plate 40*b* is fixed to the lower bracket 36. Note that the lower bracket 36 is supported on the axle of the front wheel 41. Thus, in the second embodiment, the front fender 40 is supported on the inner tube 32 via the lower bracket 36.

The rectifier member 70 may or may not have a portion that overlaps with the front fender 40 as the vehicle is viewed from the side. The rectifier member 70 may or may not have a portion that overlaps with the front fender 40 when a front fork 70 contracts as the vehicle is viewed from the side.

Also in the second embodiment, effects similar to those of the first embodiment can be realized.

While two embodiments have been described above, the embodiments are merely illustrative. Various other embodiments are possible. Next, alternative embodiment examples will be briefly described.

While the vehicle body frame 10 includes the down frame 12 located on the vehicle center line CL and the left and right lower frames 13 connected to the lower end portion of the down frame 12 in the embodiment described above, there is no particular limitation on the configuration of the down frame 12.

Figure 8:
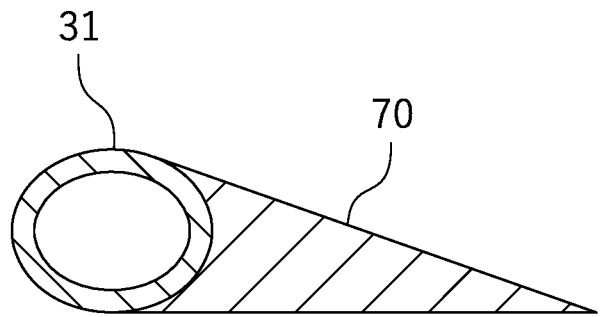
FIG. 8 is a horizontal cross-sectional view showing a rectifier member according to another embodiment.

There is no particular limitation on the shape of the horizontal cross section of the rectifier member 70. The shape of the horizontal cross section of the rectifier member 70 may be a triangular shape as shown in FIG. 8, for example. The shape of the horizontal cross section of the rectifier member 70 may be a semi-elliptical shape or semi-oblong-circular shape. The contour line of the horizontal cross section of the rectifier member 70 may be straight or may be curved. The rectifier member 70 may be a solid member or may be a hollow member.

Figure 9:
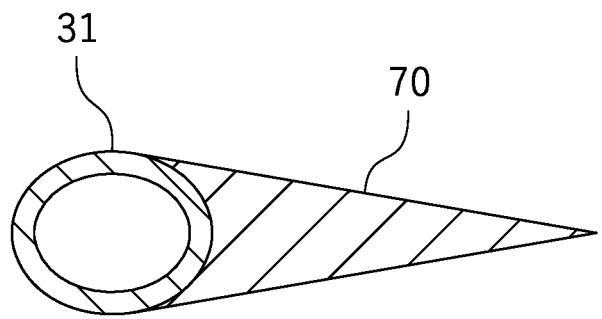
FIG. 9 is a horizontal cross-sectional view showing a rectifier member according to another embodiment.

The shape of the horizontal cross section of the rectifier member 70 does not always need to be lopsided outward in the vehicle width direction. For example, as shown in FIG. 9, the shape of the horizontal cross section of the rectifier member 70 may be a left-right symmetric shape.

There is no limitation on the method for attaching the rectifier member 70 to the outer tube 31. The rectifier member 70 may be attached to the outer tube 31 by a string-like member such as a band, may be fastened by screws, bolts, etc., or a concave portion may be formed on one of the rectifier member 70 and the outer tube 31 and a convex portion on the other so that the rectifier member 70 and the outer tube 31 are coupled together by fitting together the concave portion and the convex portion. For example, a slitted cylindrical structure may be used. The rectifier member 70 and the outer tube 31 may be bonded or attached to each other. The rectifier member 70 and the outer tube 31 may be an integral part.

The shape and the dimensions of the rectifier member 70 described above are merely an example. The rectifier member 70 does not need to be formed in a triangular shape as the vehicle is viewed from the side. The dimension L70 of the rectifier member 70 in the vehicle front-rear direction may be less than one half of the distance X in vehicle front-rear direction between the front end 31*f* of the outer tube 31 and the front end 50*f* of the radiator 50. The dimension H70 of the rectifier member 70 in the vehicle up-down direction may be less than one half of the dimension H50 of the radiator 50 in the vehicle up-down direction.

The rectifier member 70 does not need to include a portion that overlaps with a portion of the side cover 60 as the vehicle is viewed from the side. There is no particular limitation on the shape of the side cover 60.

The radiator 50 may be arranged rightward of the vehicle center line CL. The radiator 50 may be arranged rightward of the down frame 12. In this case, the rectifier member 70 is attached to the right outer tube 31. The radiator 50 may be arranged extending from leftward of the vehicle center line CL to rightward of the vehicle center line CL. For example, the radiator 50 may overlap with the left and right outer tubes 31 as the vehicle is viewed from the front. One radiator 50 may be arranged leftward of the vehicle center line CL and another radiator 50 rightward of the vehicle center line CL. The radiator 50 may be arranged both leftward of the down frame 12 and rightward of the down frame 12. In such a case, the rectifier member 70 may be attached to each of the left and right outer tubes 31.

Figure 10:
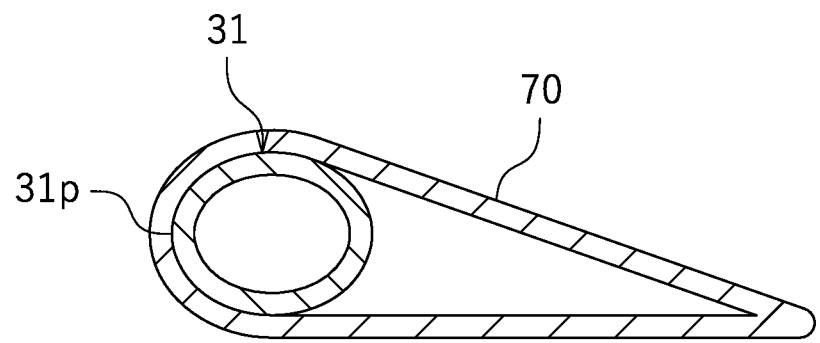
FIG. 10 is a horizontal cross-sectional view showing a rectifier member according to another embodiment.

The forward portion 31*p* of the outer tube 31 in the vehicle front-rear direction does not need to be exposed. For example, as shown in FIG. 10, the rectifier member 70 may be configured to surround the entire circumference of the outer tube 31.

The motorcycle 1 is not limited to motocrossers. The straddled vehicle is not limited to vehicles in which the gap between the front wheel and the front fender is large.

A straddled vehicle refers to a vehicle that is straddled by the rider. The straddled vehicle is not limited to the motorcycle 1. The straddled vehicle may be an auto tricycle, an ATV (All Terrain Vehicle), or a snowmobile, for example.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A straddled vehicle comprising:
   a vehicle body frame including
      a head pipe, and
      a down frame extending downward and rearward from the head pipe;
   a steering shaft rotatably inserted in the head pipe;
   a front fork linked to the steering shaft, the front fork including
      an outer tube, and
      an inner tube that is slidably inserted in the outer tube;
   a bottom bridge linking the front fork and a portion of the steering shaft that is downward of the head pipe;
   a radiator arranged rearward of the front fork, the radiator overlapping the outer tube of the front fork in a front view of the straddled vehicle;
   a front wheel supported by the front fork;
   a front fender arranged upward of the front wheel; and
   a rectifier member attached to a portion of the outer tube that is upward of the front wheel and downward of the bottom bridge, the rectifier member extending rearward in a front-rear direction of the straddled vehicle, wherein
   in a horizontal cross-sectional view of the straddled vehicle, a geometric center of an outer contour of the rectifier member is located outward, in a width direction of the straddled vehicle, of a center of the outer tube.

2. The straddled vehicle according to claim 1, wherein the rectifier member is formed to be in a streamlined shape in the horizontal cross-sectional view thereof.

3. The straddled vehicle according to claim 1, wherein the rectifier member includes a portion of which a dimension in the width direction of the straddled vehicle gradually decreases rearward in the front-rear direction.

4. The straddled vehicle according to claim 1, wherein in the front-rear direction, a dimension of the rectifier member is at least one half of a distance between a front end of the outer tube and a front end of the radiator.

5. The straddled vehicle according to claim 1, wherein the rectifier member is formed in a triangular shape in a side view of the straddled vehicle.

6. The straddled vehicle according to claim 1, wherein in an up-down direction of the straddled vehicle, a dimension of the rectifier member is at least one half of a dimension of the radiator.

7. The straddled vehicle according to claim 1, wherein a section of the outer tube is arranged upward of the inner tube.

8. The straddled vehicle according to claim 1, wherein:
   the straddled vehicle includes a side cover having a forward portion, the forward portion being arranged
      outward of the radiator in the width direction of the straddled vehicle and forward of the radiator in the front-rear direction, and
      outward of the rectifier member in the width direction, and extending outward in the width direction and forward in the front-rear direction; and
   the rectifier member includes a portion that overlaps with the forward portion of the side cover in a side view of the straddled vehicle.

9. The straddled vehicle according to claim 1, wherein the radiator is arranged outward of the down frame in the width direction of the straddled vehicle.

10. The straddled vehicle according to claim 1, wherein
    the rectifier member is attached to a rearward portion of the outer tube in the front-rear direction; and
    a forward portion of the outer tube in the front-rear direction is exposed.

11. The straddled vehicle according to claim 1, wherein the front fender is supported by the bottom bridge.

12. The straddled vehicle according to claim 1, further comprising:
    a lower bracket fixed to a lower end portion of the front fork, wherein
    the front fender is supported by the lower bracket.

* * * * *